United States Patent
Schreifels et al.

[19]

[11] Patent Number: 5,875,585
[45] Date of Patent: *Mar. 2, 1999

[54] KINK-FREE FISHING LEADER

[76] Inventors: Scott W. Schreifels, 5520 Richmond Curve, Minneapolis, Minn. 55410; Curtis Amplatz, 546 N. Lexington Pkwy., St. Paul, Minn. 55104

[ * ] Notice: The term of this patent shall not extend beyond the expiration date of Pat. No. 5,711,105.

[21] Appl. No.: 854,025

[22] Filed: May 9, 1997

Related U.S. Application Data

[63] Continuation of Ser. No. 507,553, Jul. 26, 1995, Pat. No. 5,711,105.
[51] Int. Cl.[6] .................................................. A01K 91/00
[52] U.S. Cl. ........................................................... 43/44.98
[58] Field of Search ............................................... 43/44.98

[56] References Cited

U.S. PATENT DOCUMENTS

| | | | |
|---|---|---|---|
| 1,501,953 | 7/1924 | Leslie | 43/44.98 |
| 2,108,598 | 2/1938 | Bur | 43/44.98 |
| 3,831,309 | 8/1974 | Martuch | 43/44.98 |
| 3,871,123 | 3/1975 | Olson | 43/44.98 |
| 4,604,821 | 8/1986 | Moser | 43/44.98 |
| 5,111,829 | 5/1992 | Alvarex de Toledo | 128/772 |
| 5,230,348 | 7/1993 | Ishibe et al. | 128/772 |
| 5,303,498 | 4/1994 | Yutori et al. | 43/44.98 |
| 5,711,105 | 1/1998 | Schreifels et al. | 43/44.98 |

*Primary Examiner*—Thomas Price
*Attorney, Agent, or Firm*—Merchant, Gould, Smith, Edell, Welter & Schmidt, P.A.

[57] ABSTRACT

A kink resistant fishing leader. The fishing leader is comprised of a super elastic metal alloy, such as nickel-titanium, which minimizes kinks in the fishing leader.

6 Claims, 1 Drawing Sheet

KINK-FREE FISHING LEADER

This is a continuation of application Ser. No. 08/507,553, filed Jul. 26, 1995, which application(s) are incorporated herein by reference, now U.S. Pat. No. 5,711,105.

BACKGROUND OF THE INVENTION

1. Field of the Invention

The present invention relates to an improved fishing leader for use at the end of fishing line, to be connected to fishing lures or bait.

2. Description of Related Art

A fishing leader is a connector, which is secured to the end of a fish line. Typically, the leader has a swivel with a clasp of some type attached thereto. The clasp is secured to a fishing lure or live bait.

A leader used in fishing has many functions including transmission of energy, which is imparted by the fisherman through the fishing line to the lure at the end of the leader. The leader gives the fishing line added strength at the end of a fishing line which prevents a fish from breaking the line or freeing itself. Oftentimes, with teeth bearing fish, such as northern pike and muskies, during the process that the fisherman is reeling in the fish, the fish will attempt to chew on the portion of the line connected to the lure. Thus, it is advantageous to have a high strength leader, which cannot be chewed through. Fishing leaders also provide easy attachment of different lures on a line instead of having to tie a new knot from the line to the lure every time a fisherman changes a lure. Finally, leaders also may have swivels, which allow the lure or bait to rotate in the water, without the fishing line rotating.

Commercially available leaders have traditionally been composed of carbon steel, stainless steel, plastic or the like. A fishing leader is required to have many characteristics, including strength, flexibility and resilience against deformation. However, at present, these leaders kink quite easily, which results in a deformed leader. Kinking occurs in a variety of manners. Reeling in a fish may kink the leader, due to the tensile stress applied to the leader, attempting to free a leader from weeds or sunken debris may kink a leader, and also the leader may be kinked during storage in a tackle box or on the fishing pole.

The problems encountered with a kinked leader are twofold. First, the kink weakens the leader at the point of kinking. This weakening could result in the leader breaking, thus losing valuable lures as well as fish. Secondly, a kinked leader affects the action of lures. Lures are carefully designed to have a particular action in the water. This designed action is meant to attract fish. If the leader connected to the lure is kinked, the action of the lure is adversely affected, which lessens the thrill of fishing as well as resulting in less fish being caught. Thus, there is a need for a fishing leader which is kink resistant.

SUMMARY OF THE INVENTION

The present invention provides a leader for use at the end of a fishing line for commercial or recreational fishing. Accordingly, it is an object of the present invention to provide a leader, which has flexibility, strength and proper elasticity to permit an angler to have a leader that is kink-resistant and also increase the lifespan and function of a leader as compared to previously manufactured fishing leaders. To achieve the foregoing and other objects of the present invention, an improved fishing leader comprised of a nickel-titanium alloy is provided.

DETAILED DESCRIPTION OF THE PREFERRED EMBODIMENTS

Figure 1:
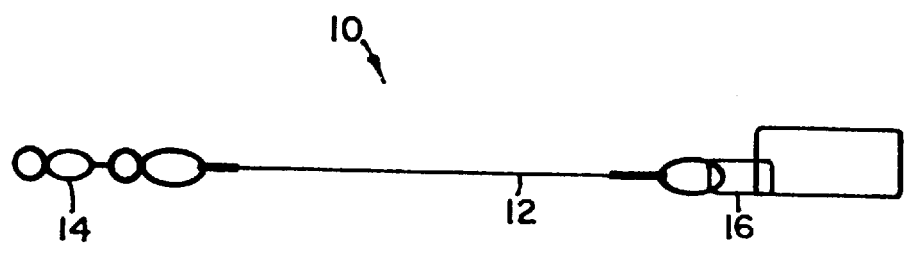
FIG. 1 is a perspective view of the leader of the present invention.

A fishing leader generally has the components shown in FIG. 1. The fishing leader 10 has a core wire 12. The core wire 12 provides strength to the leader 12, and is the portion of the leader which will kink. Core wire 12 is often looped at both ends, with one end secured to a swivel 14, and the other end secured to a means for attachment 16. The means for attachment 16 is often a clasp of some sort which may be easily secured to a lure or a hook.

The core wire 12 of the leader 10 is formed from a wire comprised of a nickel-titanium alloy preferably having nickel-titanium ratio in the range of 3:2 to 1:1. The leader may have a core of just one wire comprising nickel-titanium or may have a bundle of wires, numbering up to 40 or more, which comprise core wire 12. The core wire 12 is worked in a manner such that in a tensile test wherein the core wire is elongated by at least 5%, the core wire has a recovery percentage of at least about 90%. It is our discovery that this recovery is critical in preventing kinks in fishing leaders. Current leaders, when stressed, do not recover, and thus are weakened. It is in this weakened state that kinks form. Thus the elastic characteristics of the leader of the present invention result in a kink resistant leader. Additionally, elongation in a range of 0 to 5% does not cause any stress-induced martensitic transformation and/or martensitic reverse transformations. Thus, the load-elongation characteristics of the present fishing leader are such that the load increasing rate is either proportional or gradually decreasing throughout the elongation range of 0 to 5%. This prevents the leader from weakening, thus being prone to kinks. This resiliency, also, surprisingly, minimizes the kinks. This appears to be due to the elasticity of the core wire.

In one preferred embodiment, the alloy consists essentially of nickel and titanium and has a nickel content of about 54.0 to 57.0%. In alternative preferred embodiments, additional metals known to those in the metallurgical arts can also be added to the alloy.

In a method of making the leader of the present invention, a nickel-titanium alloy wire is originally formed by either a diffusion method or a melting method. This alloy is then cold drawn to reduce its cross-sectional area in the range of 35 to 50%. The cold drawn wire is then heat treated at a temperature in the range of 300° to 500° C. for a time period of 10 to 40 minutes.

In a preferred diffusion method of producing the alloy wire, a plurality of nickel titanium wires are bundled together to form a composite body. The composite body is then subject to cold drawing, heat diffusing treatment and a surface treatment. This resultant wire is then subject to the specific cold drawing and heat treating steps set forth above.

The following test was conducted to demonstrate the present invention's resistance to kinks.

TEST OF KINK RESISTANCE OF THE LEADER OF THE PRESENT INVENTION VERSUS A COMMERCIAL WIRE LEADER

A leader as described herein was manufactured using a core wire of nickel-titanium alloy having a nickel-titanium ratio of 55.6% N:/44.4% Ti. The core contained 6 strands of nickel-titanium alloy wire of 0.006" diameter. Test Method:

Samples of two commercially available leaders and the leader of the present invention were bent around successively smaller diameters to 180° until each leader took a permanent set or kink. For diameter sizes, drill bits were used.

TEST RESULTS
Test 1

| Drill Diameter (inches) | Berkley 30 lb Test Steel (Wire) (commercial designation STEELON ™) | The Present Invention 30 lb Test |
|---|---|---|
| 9/16 | NK | NK |
| 3/8 | NK | NK |
| 11/32 | NK | NK |
| 19/64 | NK | NK |
| 9/32 | NK | NK |
| 1/4 | K | NK |
| 7/32 | K | NK |
| 3/16 | K | NK |
| 9/64 | K | NK |
| 3/32 | K | NK |
| 3/64 | K | NK |
| .0465 | K | NK |
| .0430 | K | NK |
| .0420 | K | NK |
| .0410 | K | NK |

NK = No Kink in Leader
K = A noticeable kink or bend in leader

Test 2

| Drill Diameter (inches) | Invincible 30 lb Test (nylon coated wire) (commercially available as Invincible Nylon Coated Ball Bearing Wire Leader) | The Present Invention 30 lb Test |
|---|---|---|
| .500 | NK | NK |
| .469 | NK | NK |
| .437 | K | NK |
| .406 | K | NK |
| .375 | K | NK |
| .344 | K | NK |
| .312 | K | NK |
| .281 | K | NK |
| .250 | K | NK |
| .219 | K | NK |

NK = No Kink in Leader
K = A noticeable kink or bend in leader

Upon reviewing the results, it is apparent the leader of the present invention is capable of much greater distortion without permanent kinking. The prior art leaders began to kink with bending the leader at about 0.45 and 0.25 inches. The present invention withstands bending at less than 0.25, less than 0.1 and less than 0.05. This results in a vastly improved fishing leader will all of the advantages described above.

Therefore, it may seem that the invention offers several advantages over conventional leaders. As one skilled in the art would appreciate, various modifications could be made to the invention without departing from the spirit and scope of the invention.

We claim:

1. A fishing leader comprising a core wire secured to a swivel at a first end and a clasp at a second end, said core wire comprising a sufficient amount of nickel-titanium alloy to prevent kinks in said leader.

2. The leader of claim 1 having a nickel-titanium ratio in the range of about 3:2 to 1:1.

3. The leader of claim 1 wherein said core wire has a recovery percentage of about 90% when elongated 5%.

4. The leader of claim 1 having a kink resistance of being wrapped around a circular core of 0.25 inches and not permanently kinking.

5. The leader of claim 1 having an additional non-nickel-titanium metal wire added to said core wire.

6. The leader of claim 1 wherein an additional metal is added to said nickel-titanium alloy.

* * * * *

UNITED STATES PATENT AND TRADEMARK OFFICE
CERTIFICATE OF CORRECTION

PATENT NO. : 5,875,585

DATED : MARCH 2, 1999

INVENTOR(S) : SCHREIFELS ET AL.

It is certified that error appears in the above-identified patent and that said Letters Patent is hereby corrected as shown below:

Title page, [56] References Cited, U.S. Patent Documents: "Bur" should read —Burr—

Title page, [56] References Cited, U.S. Patent Documents: "Alvarex" should read —Alvarez—

Col. 2, line 17: insert —a— after "having"

Col. 2, line 30: delete "not" after "does"

Col. 2, line 30: delete "any" after "cause"

Col. 4, line 21: "will" should be —with—

Signed and Sealed this

Twenty-first Day of March, 2000

Attest:

Attesting Officer

Q. TODD DICKINSON

Commissioner of Patents and Trademarks

(12) EX PARTE REEXAMINATION CERTIFICATE (4922nd)
United States Patent
Schreifels et al.

(10) Number: US 5,875,585 C1
(45) Certificate Issued: Mar. 30, 2004

(54) KINK-FREE FISHING LEADER

(75) Inventors: Scott W. Schreifels, Minneapolis, MN (US); Curtis Amplatz, St. Paul, MN (US)

(73) Assignee: Innovative Sport Technologies, St. Paul, MN (US)

Reexamination Request:
No. 90/005,799, Aug. 24, 2000

Reexamination Certificate for:
Patent No.: 5,875,585
Issued: Mar. 2, 1999
Appl. No.: 08/854,025
Filed: May 9, 1997

Certificate of Correction issued Mar. 21, 2000.

Related U.S. Application Data

(63) Continuation of application No. 08/507,553, filed on Jul. 26, 1995, now Pat. No. 5,711,105.

(51) Int. Cl.$^7$ ............................................. A01K 91/00
(52) U.S. Cl. ..................................................... 43/44.98

(56) References Cited

U.S. PATENT DOCUMENTS

| | | | | |
|---|---|---|---|---|
| 3,451,305 A | 6/1969 | Christensen et al. | ............. | 87/6 |
| 3,758,979 A | 9/1973 | Martuch et al. | ........... | 43/44.98 |
| 3,868,785 A | 3/1975 | Foote | ........................ | 43/44.98 |
| 3,943,652 A | 3/1976 | Aunspaugh | ................ | 43/42.74 |
| 4,018,308 A | 4/1977 | Rogen | .......................... | 187/17 |
| 4,107,370 A | 8/1978 | Ingraham | ..................... | 428/247 |
| 4,197,643 A | 4/1980 | Burstone et al. | .............. | 433/20 |
| 4,201,008 A | 5/1980 | Sparkman | .................. | 43/43.13 |

(List continued on next page.)

FOREIGN PATENT DOCUMENTS

| | | |
|---|---|---|
| DE | 43 07 593 | 3/1993 |
| JP | 52095522 | 8/1977 |
| JP | 62224650 | 10/1987 |
| JP | 2-2311 | 6/1988 |
| JP | 63-185047 | 7/1988 |
| JP | 3-272634 | 12/1988 |
| JP | H1-91729 | 4/1989 |
| JP | 4-121135 | 9/1990 |
| JP | H3-236732 | 10/1991 |
| JP | 3236732 | 10/1991 |
| JP | 4124244 | 4/1992 |
| JP | 6-7061 | 6/1992 |
| JP | H5-70408 | 10/1993 |
| JP | 6108204 | 4/1994 |
| JP | 6108205 | 4/1994 |
| JP | 6189653 | 7/1994 |
| JP | 8-308436 | 5/1995 |

OTHER PUBLICATIONS

Thorne Brothers Custom Tackle, Windel's Leaders, p. 21, 1988.*
Stoeckel, et al., *Superelastic Ni–Ti Wire,* Wire Journal International, Mar. 1991, pp. 45–50.
Dunaway, *Complete Book of Baits, Rigs & Tackle,* 1973 Wickstrom Publishers, Inc., pp. 5, Table of Contents (p. 6, 7), pp. 69–70, 73–79.
Kauffman, et al., *The Story of Nitinol: The Serendipitous Discovery of the Memory Metal and Its Applications,* The Chemical Educator, 18/vol. 2 No. 2, 21 pp., 1996.
Burstone, et al., *Chinese NiTi wire—A new orthodontic alloy,* American Journal of Orthodontics, vol. 87, No. 6, Jun., 1985, pp. 445–452.
Explanation of Japanese boat fishing special wording, www.turi.com/mad_angler/html/j–fish/how–to/ex–word_e.html#anchor372951 (translation of "harisu": JP4–121135).
Japanese–English Ocean Dictionary, www/sainet.or/jp/-k/naka/jeh.html ("harisu").
Tackle, www.biwa.ne/jp/-y-ogura/shikake/sikak_eg.html (figure and "harisu").
Akashi in English, www.kh.rim.or.jp/-sumip/photo 1.htm (figure and "harisu").

*Primary Examiner*—Kurt Rowan

(57) ABSTRACT

A kink resistant fishing leader. The fishing leader is comprised of a super elastic metal alloy, such as nickel-titanium, which minimizes kinks in the fishing leader.

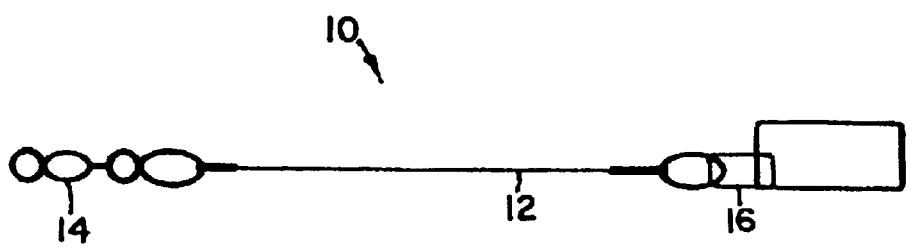

U.S. PATENT DOCUMENTS

| | | |
|---|---|---|
| 4,321,854 A | 3/1982 | Foote et al. .................... 87/6 |
| 4,330,956 A | 5/1982 | McCarthy ........................ 43/4 |
| 4,510,710 A | 4/1985 | Hanna et al. ............. 43/42.13 |
| 4,571,877 A | 2/1986 | Montgomery ............. 43/42.11 |
| 4,718,191 A | 1/1988 | Gentry ..................... 43/42.13 |
| 4,772,112 A | 9/1988 | Zider et al. ................... 351/41 |
| 4,779,372 A | 10/1988 | Pozo Obeso ............... 43/44.98 |
| 4,815,233 A | 3/1989 | Pingel ...................... 43/42.11 |
| 4,895,438 A | 1/1990 | Zider et al. ................... 351/41 |
| 4,896,955 A | 1/1990 | Zider et al. ................... 351/41 |
| 4,909,510 A | 3/1990 | Sahatjian .................. 273/73 R |
| 5,022,177 A | 6/1991 | Gibson ...................... 43/42.11 |
| 5,203,103 A | 4/1993 | Hawley ....................... 43/17.1 |
| 5,207,732 A | 5/1993 | Stark ......................... 43/44.98 |
| 5,226,268 A | 7/1993 | Sisson, Jr. ................ 43/42.13 |
| 5,251,395 A | 10/1993 | Wicklund .................. 43/42.25 |
| 5,381,621 A | 1/1995 | Fuller ........................ 43/42.13 |
| 5,442,037 A | 8/1995 | Lee et al. .................... 528/301 |
| 5,547,140 A | 8/1996 | Kawabe et al. ............. 242/247 |
| 5,586,734 A | 12/1996 | Kawabe et al. ............. 242/247 |

\* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *